United States Patent
Vineyard, Jr. et al.

(10) Patent No.: US 6,727,920 B1
(45) Date of Patent: Apr. 27, 2004

(54) MULTIPLE OPERATING SYSTEM QUICK BOOT UTILITY

(75) Inventors: James L. Vineyard, Jr., Meridan, ID (US); James A. McKeeth, Nampa, ID (US)

(73) Assignee: Micron Technology, Inc., Boise, ID (US)

(*) Notice: Subject to any disclaimer, the term of this patent is extended or adjusted under 35 U.S.C. 154(b) by 508 days.

(21) Appl. No.: 09/266,325

(22) Filed: Mar. 11, 1999

(51) Int. Cl.[7] ............................................. G06F 3/00
(52) U.S. Cl. ....................... 345/810; 345/846; 345/839; 345/764
(58) Field of Search ................. 345/352, 348, 345/333, 326, 336, 339, 810, 846, 762, 764, 839, 765; 717/11, 174

(56) References Cited

U.S. PATENT DOCUMENTS

| | | | |
|---|---|---|---|
| 4,675,814 A | * 6/1987 | Murai et al. | 717/11 |
| 5,136,711 A | 8/1992 | Hugard et al. | 395/700 |
| 5,367,661 A | 11/1994 | Hough et al. | 395/500 |
| 5,428,792 A | 6/1995 | Conner | 395/700 |
| 5,504,904 A | 4/1996 | Dayan et al. | 395/700 |
| 5,562,523 A | 10/1996 | Asano et al. | 451/1 |
| 5,617,560 A | 4/1997 | Ichikawa | 395/500 |
| 5,671,366 A | * 9/1997 | Niwa et al. | 710/101 |
| 5,684,952 A | * 11/1997 | Stein | 709/221 |
| 5,689,701 A | 11/1997 | Ault et al. | 395/610 |
| 5,692,143 A | * 11/1997 | Johnson et al. | 345/339 |
| 5,715,458 A | 2/1998 | Holder et al. | 395/680 |
| 5,887,163 A | * 3/1999 | Nguyen et al. | 713/2 |
| 5,966,540 A | * 10/1999 | Lister et al. | 717/11 |
| 6,031,527 A | * 2/2000 | Shoji et al. | 345/333 |
| 6,032,239 A | 2/2000 | Beelitz | 711/173 |
| 6,076,734 A | * 6/2000 | Dougherty | 235/462.01 |
| 6,202,206 B1 | * 3/2001 | Dean et al. | 717/11 |

OTHER PUBLICATIONS

Micron Electronics, Inc.—Assignee, U.S. App. S/N 09/201,097, Filed Nov. 30, 1998, "OS Multi Boot Integrator."
Micron Electronics, Inc.—Assignee, U.S. App. S/N 09/201,911, Filed Nov. 30, 1998, "OS Multi Boot Integrator."

* cited by examiner

*Primary Examiner*—John Cabeca
*Assistant Examiner*—Kieu D. Vu
(74) *Attorney, Agent, or Firm*—Knobbe, Martens, Olson & Bear LLP

(57) ABSTRACT

A computerized user interface for assisting a computer user selects a default operating system for a computer. The computerized interface operates during a current computing session and provides a list of operating systems available. A user can make a selection using standard activatible controls such as icons, alphanumeric lists and highlighting. Once selected, an operating becomes the default operating system software on the computer. Therefore, during the next startup of the computer a selected operating system will boot unless there is some other intervention. In addition to selecting an operating system, this invention can also be used to cause the computer to restart. Restart can be set to execute immediately or to execute upon a change in the default operating system. In addition this invention can be caused to uninstall thereby erasing the program files relating to this invention.

20 Claims, 5 Drawing Sheets

MULTIPLE OPERATING SYSTEM QUICK BOOT UTILITY

BACKGROUND

The present invention relates to computer software utility programs, and more specifically, to a software program designed to simplify a choice of operating systems to load upon reboot of a computer.

In a computing environment that takes advantage of more than one operating system, the choice of which operating system will load into a computer upon startup has traditionally been determined by a user during the computer startup sequence. Typically, a user waits for a load utility to present a menu during a startup routine. A load utility menu will present a list of available operating systems. A user can select a desired operating system to load during an imminent computing session. Most load utility menus are designed such that the ability to choose an operating system is only available for some window of time. If no intervening action is taken during that window of time, the computer reverts to a default operating system and proceeds with the boot sequence.

During a computing session if it is required that a different operating system be utilized, the computer must be rebooted and a selection must be made from the menu during the computer startup sequence. Rebooting of a computer can be a lengthy process, often lasting several minutes. A user needs to be attentive during a typical reboot procedure and make a timely choice from a menu designating operating systems. A window of time allotted a user during which the user has the opportunity to designate a choice of operating systems may only last seconds. A user that is not attentive may let this window of time pass, wherein a computer will continue to boot using a default operating system. If the default operating system is not the system of choice for the user, the user will need to wait until the default operating system finishes loading and then shut it down, starting the sequence over again. It would be useful to have a means of designating from a current computing session an operating system to load upon the next computer start sequence.

Every general purpose computer must have an operating system to run application programs. An operating system performs basic tasks such as recognizing input from a keyboard, sending output to a display screen, keeping track of files and directories on a disk and controlling peripheral devices such as disk drives and printers. FIG. 1. In addition, all operating systems make sure that different programs running at the same time do not interfere with each other and provide for security against unauthorized users.

Application programs run on an operating system, therefore, an application program must be written to run on a particular operating system. A user's choice of operating system is often determined by the applications that will be run. Popular operating systems for computers include DOS, Windows™, Windows 95™, Windows NT™, OS/2™, and Linux. Advanced users may wish to have Windows NT™, OS/2™ and Linux on the same machine. Technicians and support type personnel who wish to emulate different operating environments of various users can also find multiple operating systems useful. In addition, developers may need several versions of the same operating system available. With enough disk space, it is possible to have multiple operating systems on one machine.

During typical start up of a computer, the first program to execute is the power on self-test program or POST. Following POST, a basic input output system or BIOS runs. Amongst other things, BIOS is responsible for directing a computer to a boot sector of a disk on which an operating system is installed. Having identified a correct disk and sector, Read Only Memory (ROM) that holds the BIOS initializes code to read the first record from that disk into storage. The first record is referred to as a master boot record or MBR. Computer hard drives can be partitioned such that each partition can potentially hold a different operating system. A MBR will look to the partition table and choose a primary partition that is marked active or startable. The MBR program can read the first 512 byte sector from the active primary partition. This first sector commonly comprises an operating system loader program.

When utilizing multiple operating systems, it is sometimes preferable to have the MBR boot load a loader utility. A loader utility can specify information about logical partitions and locate operating systems stored on them. One example of a loader utility is Boot Manager. Boot Manager is part of the OS/2™ operating system. Boot Manager is not a full operating system; it is only a utility to direct a computer towards a full operating system. To run an operating system, Boot Manager is directed to the first sector of a designated partition or volume and runs a program contained there.

A BIOS initialization code locates a first 512 byte record of a first disk drive and reads code on it comprising a MBR. The MBR then reads a first sector of an active partition and executes code contained on the active partition. If the active partition is a load utility, the boot manager directs the computer to a first sector of a partition or logical volume containing code comprising a chosen operating system. An operating system may be chosen by operator selection or as a default of the boot manager.

A computer with multiple operating systems can utilize a hard drive with multiple partitions. Each partition may belong to a different file system. Generally, an operating system will ignore those partitions whose ID type represents an unknown file system type. A load utility is typically installed in its own non-DOS, 1 megabyte, primary partition on the first hard drive. In this way, ROM or BIOS initialization code first accesses the master boot record. The master boot record sees that a load utility partition is active and loads that program into memory. The load utility presents a menu on a display giving a user an opportunity to make a selection from available operating systems. A computer boots to a default system if there is no response from a user within a window of time comprising a time out period.

In a similar fashion, Windows NT™ uses a utility called the NT loader. With Windows NT™, the NT boot sector loads a hidden program. The hidden program displays a boot selection menu based on information in a plain text data set, such as a boot.ini file. Typical to a load utility, NT loader gives a user a specified time out period to select an option from the menu. If nothing is entered, Windows NT™ is loaded by default.

Typically, a boot sector manager will reference a boot.ini file. Amongst other information the boot.ini file can contain a list of different operating systems available to the computer upon boot up. In addition a boot.ini can store information such as how many seconds a menu for user selection of the operating system is made available to a user before a default operating system loads. Operating system product vendors sometimes support rebooting into a different interface of their own proprietary operating systems from a current computing session. For instance, Microsoft Windows 95™ includes the capability of rebooting into a DOS interface. It would be useful for a utility to be available from a standard operating system interface that allows for selection of an operating system to load upon reboot of a computer. Such a utility would provide a customizable, user friendly, operating system selection interface. In order to be most useful such an interface should be simple enough so as not to require explanation on how to implement a change in operating system software.

SUMMARY OF THE INVENTION

Accordingly, the present invention provides a method and apparatus for specifying an operating system of choice during a current computing session such that upon reboot, a computer will boot up into a specified operating system. Generally, a computerized user interface 400 is provided to assist a user in the selection of a software operating system to be used on a computer. A selected operating system is set to load by default upon the next start up of the computer. Computer executable program code, i.e. software, running on a computer directs the computer to perform desired functions relating to selection and loading of an operating system on a computer. This invention also comprises a computer readable medium onto which program code for implementing in the computer desired function ability has been stored.

Computer software running on a computer causes a user interface 400 to present to a user a list of available operating systems for the computer. This computerized user interface 400 allows a user to select a desired operating system via a user activatible control. User activatible controls include, for example, clicking on an icon, cursoring to a selection until it is highlighted, selecting an alphanumeric designation corresponding with a desired operating system, typing out the selection or other known activatible control mechanisms for making a selection from a display. An operating system correlating with the selection made by the user is made to load upon restarting of the computer.

Providing an interface for other options related to the selection of an operating system also comprise this invention. Other options that can be made a part of the interface include causing an immediate restart or reboot of the computer with a change in default operating system, restarting the computer in response to an activatible control, specifying a time out period during which a user can override a default operating system, installation of the program code, uninstalling the program code, or reinstalling the program code.

DETAILED DESCRIPTION OF THE INVENTION

Figure 1:
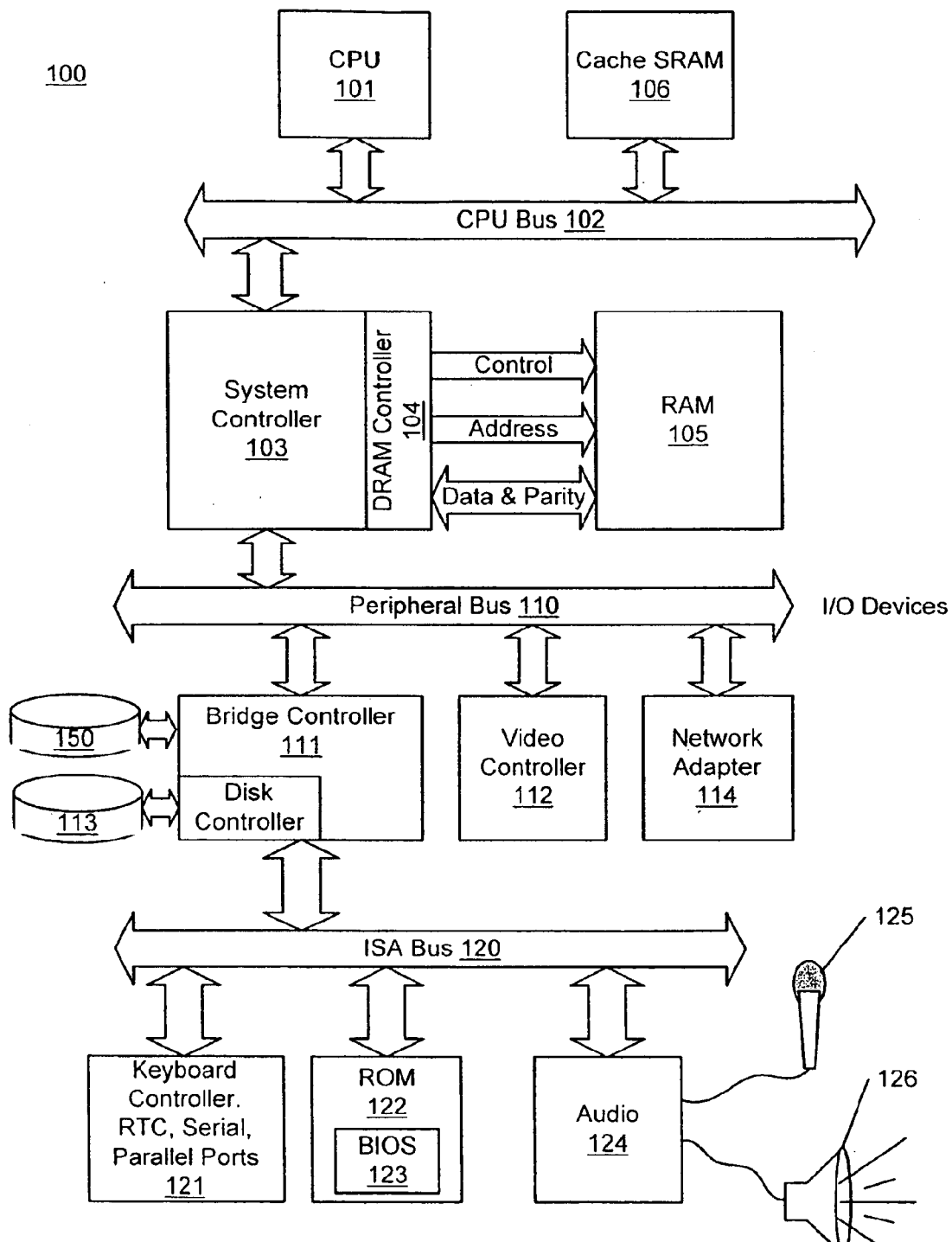
FIG. 1 is a computer hardware diagram.

Referring to FIG. 1, physical resources of a computer system 100 are depicted. The computer 100 has a central processor 101 connected to a processor host bus 102 over which it provides data, address and control signals. The processors 101 may be any conventional general purpose single- or multi-chip microprocessor such as a Pentium® processor, a Pentium® Pro processor, a Pentium II® processor, a MIPS® processor, a Power PC® processor or an ALPHA® processor. In addition, the processor 101 may be any conventional special purpose microprocessor such as a digital signal processor or a graphics processor. The microprocessor 11 has conventional address, data, and control lines coupling it to a processor host bus 102.

The computer 100 includes a system controller 103 having an integrated RAM memory controller 104. The system controller 103 is connected to the host bus 102 and provides an interface to random access memory 105. The system controller 103 also provides host bus to peripheral bus bridging functions. The controller 103 thereby permits signals on the processor host bus 102 to be compatibly exchanged with signals on a primary peripheral bus 110. The peripheral bus 110 may be, for example, a Peripheral Component Interconnect (PCI) bus, an Industry Standard Architecture (ISA) bus, or a Micro-Channel bus. Additionally, the controller 103 can provide data buffering and data transfer rate matching between the host bus 102 and peripheral bus 110. The controller 103 thereby allows, for example, a processor 101 having a 64-bit 66 MHz interface and a 533 Mbytes/second data transfer rate to interface to a PCI bus 110 having a data path differing in data path bit width, clock speed, or data transfer rate.

Accessory devices including, for example, a video display controller 112 and network controller 114 can be coupled to the peripheral bus 110. The network controller 114 may be a modem, an Ethernet networking card, a cable modem, or other network access device. The system 100 may also include a secondary peripheral bus 120 coupled to the primary peripheral bus 110 through a bridge controller 111. The secondary peripheral bus 120 can be included in the system 100 to provide additional peripheral device connection points or to connect peripheral devices that are not compatible with the primary peripheral bus 110. For example, in the system 100, the secondary bus 120 may be an ISA bus and the primary bus 110 may be a PCI bus. Such a configuration allows ISA devices to be coupled to the ISA bus 120 and PCI devices to be coupled to the PCI bus 110. The bridge controller 111 can also include a hard disk drive control interface to couple a hard disk 113 to the peripheral bus 110.

The computer 100 also includes non-volatile ROM memory 122 to store basic computer software routines. ROM 122 may include alterable memory, such as EEPROM (Electronically Erasable Programmable Read Only Memory), to store configuration data. For example, EEPROM memory may be used to store hard disk 113 geometry and configuration data. BIOS routines 123 are included in ROM 122 and provide basic computer initialization, systems testing, and input/output (I/O) services. For example, BIOS routines 123 may be executed by the processor 101 to process interrupts that occur when the bridge 111 attempts to transfer data from the ISA bus 120 to the host bus 102 via the bridge 111, peripheral bus 110, and system controller 103. The BIOS 123 also includes routines that allow an operating system to be "booted" from the disk 113 or from a server-computer using a local area network connection provided by the network adapter 114. An operating system 252 boot operation can occur after computer 100 is turned on and power-on self-test (POST) routines stored in the BIOS 123 complete execution, or when a reset switch is depressed, or following a software-initiated system reset or a software fault. During the boot process, the processor 101 executes BIOS 123 software to access the disk controller 111 or network controller 114 and thereby obtain a high-level operating system. Examples of high-level operating systems are, the Microsoft Disk Operating System (DOS)™, Windows 95™, Windows NT™, a UNIX operating system, the Apple MacOS™ operating system, or other operating system.

An operating system may be fully loaded in the RAM memory 105 or may include portions in RAM memory 105, disk drive storage 113, or storage at a network location. For example, the Microsoft Windows 95™ operating system includes some functionality that remains in memory 105 during the use of Windows 95™ and other functionality that is periodically loaded into RAM memory 105 on an as-needed basis from, for example, the disk 113. An operating system, such as Windows 95™ or Windows NT™ provides functionality to control computer peripherals such as devices 310, 320, 330, 350, 360, 370, and 113, and to execute user applications. User applications may be commercially available software programs such as a word processor, spreadsheet, database, client software, computer aided drawing and manufacturing software, scientific software, internet access software and many other types of software. User applications may access computer system peripheral controllers 112–114, 121, and 124 through an application programming interface provided by the operating system and/or may directly interact with underlying computer system 100 hardware.

Figure 2:
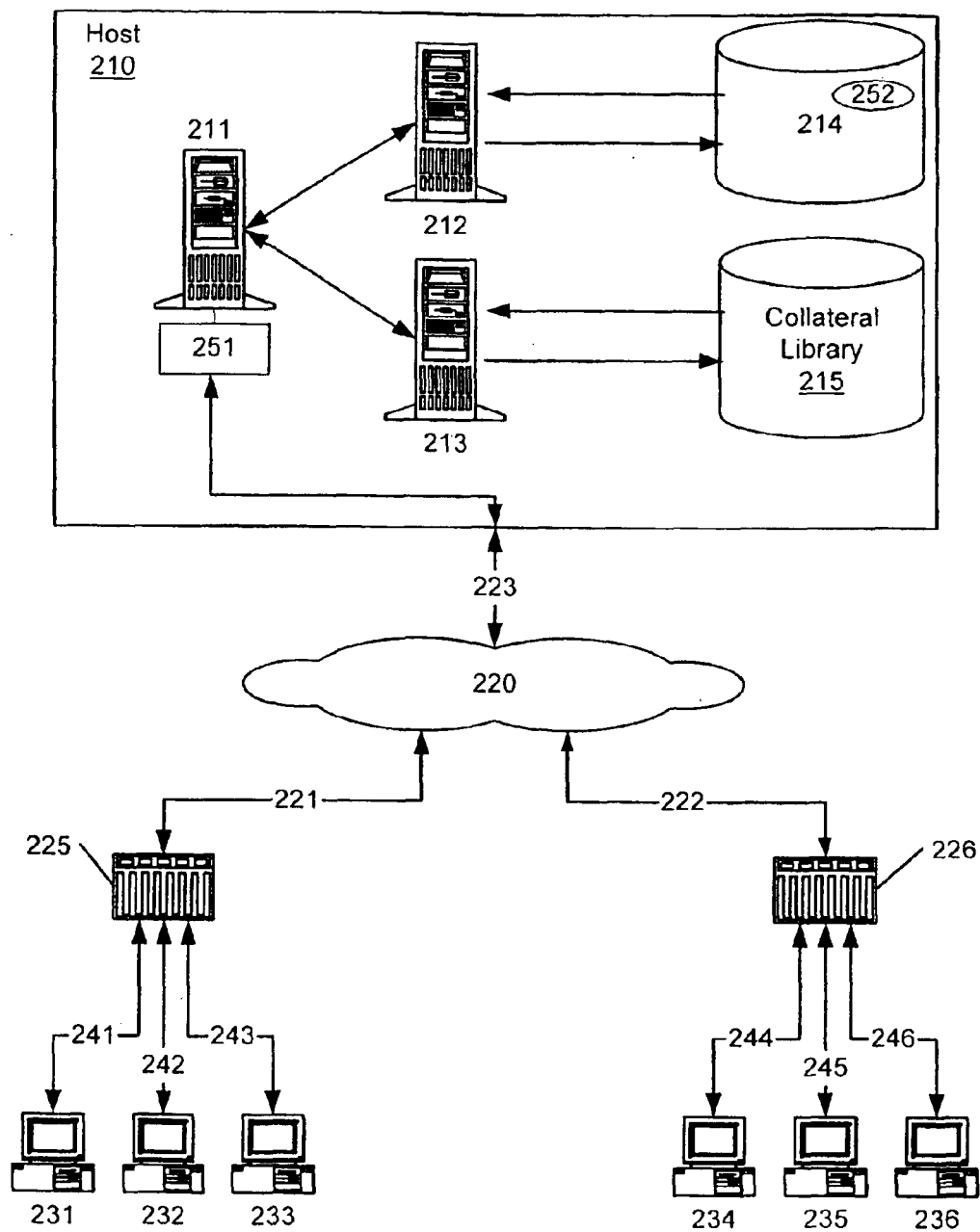
FIG. 2 is a computer network diagram.

Referring to FIG. 2, a collection of computers 100 can serve as components of a computer network. A network operating system (NOS) can also be utilized as a high level operating system. A computer network 200 can include a host computer system 210 and client computers 231–236. The client computers 231–236 can communicate with the host 210 to obtain data stored at the host 210 in databases 214–215. The client computer 231–236 may interact with the host computer 210 as if the host was a single entity in the network 200. However, the host 210 may include multiple processing and database sub-systems that can be geographically dispersed throughout the network 200.

Generally, a computer system running a boot selection software program facilitating a user's choice of high level operating system 252 is disclosed. An executable computer program code running on a computer 110, or stored on a computer readable medium 113 or 330, gives a user of the computer the ability to select an operating-system from a plurality of available high level operating systems 252. Selection of an operating system 252 causes that operating system 252 to boot when the computer is restarted.

Figure 3:
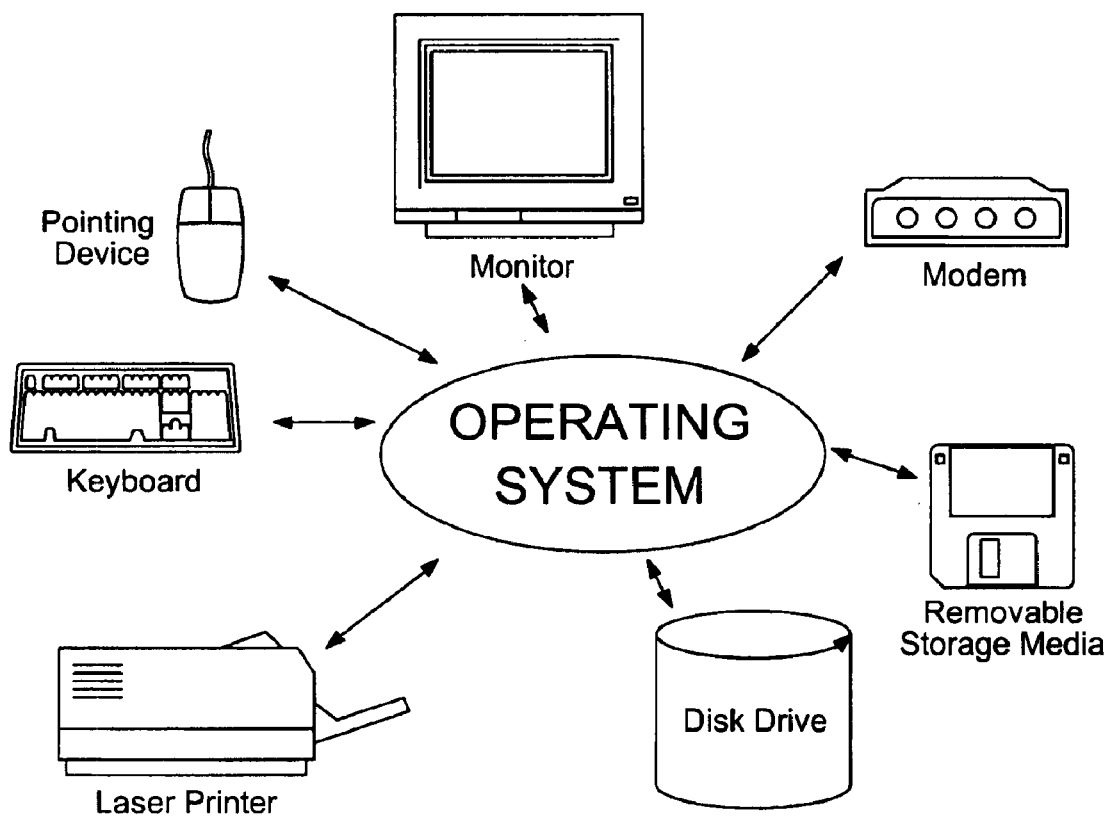
FIG. 3 illustrates the interaction of an Operating System with computer components.

Referring now to FIG. 3, a user can activate a user activatible control presented on a display 310, through use of an input device such as a keyboard 360 or a pointing device 370, associated with a computer 100. Activation of a control causes boot selection software to execute.

Normal execution of boot selection software provides a user interface 400. The user interface 400 can be any interface amenable to understanding by the user. One embodiment of a user interface comprises a list of selections that can be made by a user. Selections include various operating systems 410 that are available on the computer. An interface can include icons 510, radial buttons 420, check buttons 421, push buttons, or other well-known interface mechanisms commonly deployed in graphical user interface programs.

Figure 4:
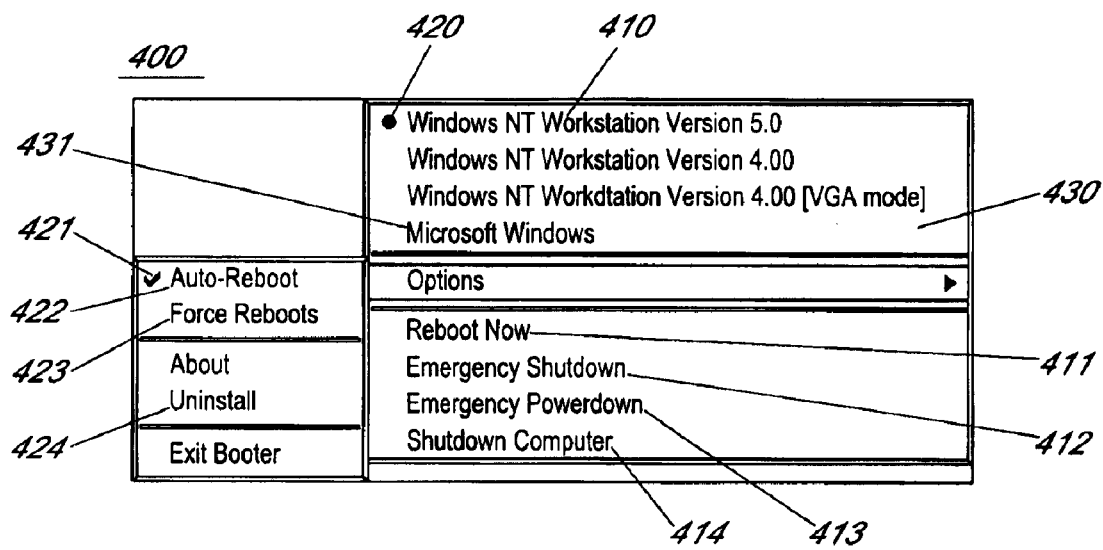
FIG. 4 illustrates one example of a user interface of this invention.
Figure 5:
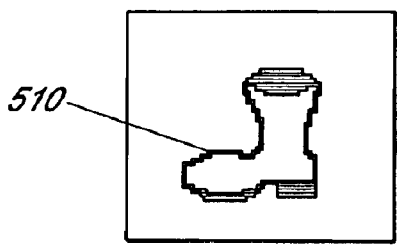
FIG. 5 illustrates a boot icon that can be used as an activatible control to execute the computer program code.

Referring to FIG. 4, the user interface 400 waits for input from a user. Using a pointing device 370 or keyboard 360 associated with the computer 100 a user can scroll through a menu 410 of available operating systems 380 presented on the interface. A user activatible control allows selection of an operating system 380 from the menu presented on the user interface 400.

Selection of an operating system 380 causes a default for a load utility in the computer 100 to be set to the operating system 380 selected from the user interface menu 410. As a result, the next time the computer is started, the default operating system for the load utility will be the operating system 380 selected from the menu 410.

One embodiment of a user activatible control suitable to start a boot selection program uses an icon symbolic of a boot 510 worn by a person. A preferred location for a boot icon would be in the lower right hand corner of a taskbar making the option available to a user at all times, even when an application program is set to be viewed at full screen mode. Additional locations for a boot icon include on a desktop, in a folder or other location accessible to a user. Other embodiments of user Interactive controls suitable to start a boot selection program comprise for example, using a keyboard mouse or other pointing device associated with the computer to click on a directory entry of the application, select an alphanumeric character corresponding to a list comprising available options, icons 510, radial buttons 420, check buttons 421, push buttons, and calling a program from a command line argument.

One embodiment of a boot selection program interface includes regions for operating systems 430 and regions for controls 431, and for other procedures 411–414 and 421–424 related to restarting the computer 100. Typical procedures can include a Reboot Now 411 procedure for causing the computer 100 to reboot and various shutdown options. An Emergency Shutdown procedure 412 of a computer can cause all open applications to end immediately without any user prompt. Typically, this is accomplished with an end task command being sent to the open application. Emergency powerdown 413 also ends all tasks and sends a power-off command to the computer but seeks confirmation first. A Shutdown Computer option 414 can follow standard procedures for powering down.

One embodiment of this invention includes the ability to set an automatic reboot if a change in operating system 380 is selected. An automatic reboot option 422 can be set from the user interface 400. A Radial button 420 or checkbox 421 can be used as typical user activatable controls for setting this option. Other known means of selection may also be used. If an automatic reboot option is selected, computer code can cause the computer to restart itself. During restart, the computer will boot the operating system 380 last selected as default.

A force reboot button 423 can cause the computer to restart when a change in operating system 380 is made. Force reboot can include the additional step of forcing any open applications to close with an end task command.

A user interface 400 for a boot selection program can also comprise activatable controls to cause the computer to uninstall 424 or reinstall executable program code relating to this invention. Reinstallation can be helpful in that an installation routine can survey the computer and determine what operating systems are available and on which partition each operating system 380 is stored.

In other embodiments a user interface 400 can offer options to configure settings associated with the boot process. These settings include, for example, the number of seconds a load utility will pause during the boot process and wait for a user to specify an operating system 380 other than a default operating system 380.

Options made via the user interface 400 cause the computer program code to modify appropriate files relating to each option. These files would include by way of example the boot.ini file and the files comprising the computer program code of this invention.

Figure 6:
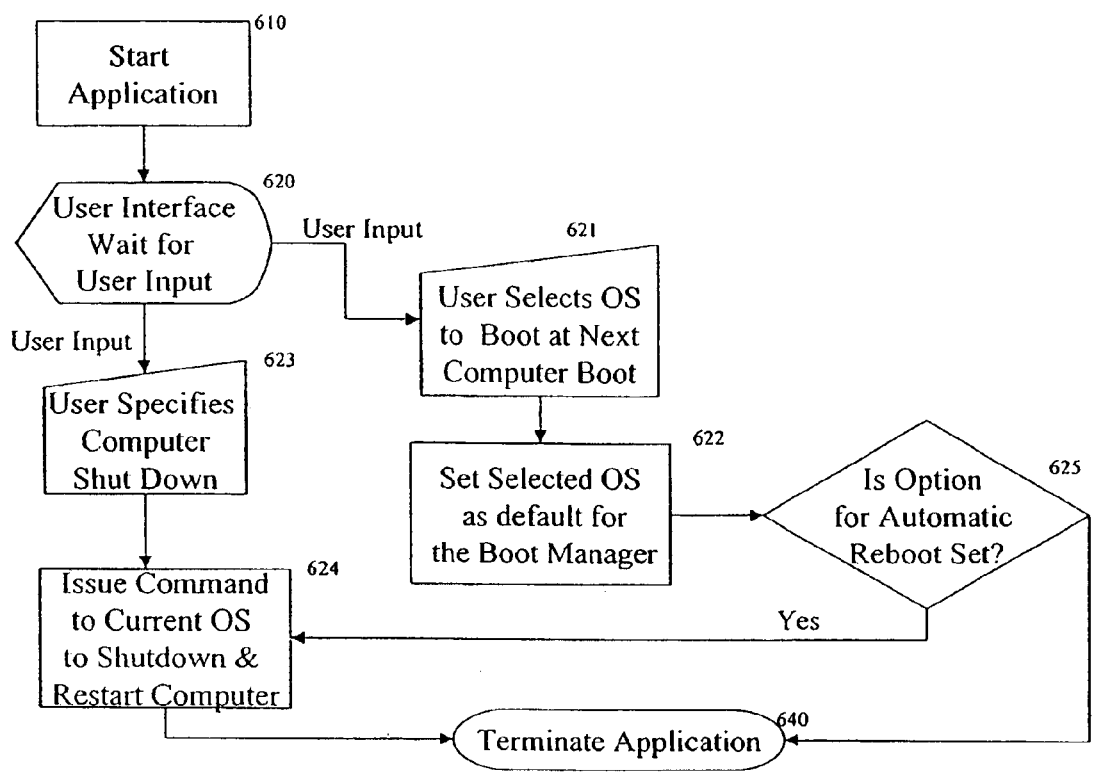
FIG. 6 shows the logic flow of an embodiment of this invention.

Referring now to FIG. 6, a logical flow for one embodiment of the invention is presented. As computer program code is started 610, a user interface can be presented on a computer screen, the user interface can wait for user input 620. A user can select an operating system to boot during the next computer boot up 621. The selected operating system can be set as the default operating system in the Boot Manager 622 of the computer. The computer code can then test to see if an option for automatic reboot is set 625.

A "yes" response to the test for an automatic reboot option can issue a command to a current operating system to shutdown and restart the computer 624. After which the application program will terminate 640.

A "no" response to the test for an automatic reboot option can proceed directly to termination of the application 640.

Many different software languages can be used to implement this invention. A preferred embodiment utilizes a compilable language such as C programming language. Other languages such as for example Delphi or Basic will also function well.

Other implementations are within the scope of the following claims.

What is claimed is:

1. A computerized user interface for assisting a computer user in selecting an operating system for use on a computer comprising:
    a computer for storing, displaying, and processing information;
    computer program code running on said computer, the computer program code operating in a current computing session and implementing in the computer the steps of:
        providing an interactive menu on a display, said menu comprising a list of operating systems available to run on said computer;
        providing an activatible control mechanism for selecting one of the operating systems displayed on said menu; and
        setting a default operating system for a load utility installed on said computer to an operating system selected with the activatible control.

2. The computerized user interface of claim 1 wherein the computer program code further implements a mechanism to allow a user to set a duration of time comprising a time out period during which the load utility pauses and allows a user to specify an operating system other than the default operating system.

3. The computerized user interface of claim 1 wherein the computer program code further comprises a mechanism to cause the computer to restart, said mechanism for causing the computer to restart being executable by a user.

4. The computerized user interface of claim 3 wherein the mechanism for causing a computer to restart is automatically executed if the default operating system is changed.

5. The computerized user interface of claim 1 wherein a change of the default operating system causes a file containing settings for a boot menu to be modified wherein the file specifies the operating system selected.

6. The computerized user interface of claim 1 wherein the computer program code additionally comprises a mechanism for uninstalling the computer program code.

7. The computerized user interface of claim 1 wherein the computer program code additionally comprises a mechanism for reinstalling the computer program code.

8. The computer user interface of claim 1 wherein an installation routine for installing the computer program code surveys the computer and determines the presence of operating systems available on said computer and the partition on which the operating system resides.

9. A method for specifying during a current computing session a computer operating system of choice comprising:
    displaying an interactive menu on a computer display, said display listing the available operating systems;
    providing a selection mechanism for selecting an operating system of choice;
    selecting an operating system of choice via said selection mechanism; and
    setting the default operating system for a load utility installed on said computer to the operating system selected with the selection mechanism, said default operating system loading by default upon the next computer start up.

10. The method for specifying an operating system of choice on a computer of claim 9 further comprising setting a duration of time comprising a time out period during which the load utility pauses and allows a user to specify an operating system other than the default operating system.

11. The method for specifying an operating system of choice on a computer of claim 9 further comprising restarting the computer in response to an input made via an input device calling for the computer to restart.

12. The method for specifying an operating system of choice on a computer of claim 9 further comprising causing the computer to restart automatically if the default operating system is changed.

13. The method for specifying an operating system of choice on a computer of claim 9 further comprising providing a mechanism for uninstalling computer program code that performs the steps of displaying, providing, selecting, and setting.

14. The method for specifying an operating system of choice on a computer of claim 9 further comprising providing a mechanism for reinstalling computer program code that performs the steps of displaying, providing, selecting, and setting.

15. The method for specifying an operating system of choice on a computer of claim 9 further comprising surveying the computer and determining the presence of operating systems available on said computer and the partition on which the operating system resides.

16. An article of manufacture comprising a computer usable medium having a computer readable code means embodied therein for selecting an operating system comprising:
    a computer readable code means for displaying an interactive menu on a computer display, said display listing the available operating systems;
    a computer readable code means for providing a selection mechanism for selecting an operating system of choice;
    a computer readable code means for selecting an operating system of choice via said selection mechanism; and
    a computer readable code means for setting the default operating system for a load utility installed on said computer to the operating system selected with the selection mechanism, said default operating system loading by default upon the next computer start up.

17. A user interface for a computer displayed by a boot selection program for selecting an operating system, said user interface comprising:
   a first display region listing available operating systems; and
   a second display region including a user activatible control to select one of the available operating systems, wherein a selected operating system is loaded by the computer upon a subsequent computer start up.

18. The user interface of claim 17 further comprising a third display region for initiating a command to restart the computer, said third region including user activatible controls to specify when the computer should restart.

19. The user interface of claim 17 wherein the interface is displayed upon clicking an icon of a boot.

20. A programmed computer for selecting an operating system comprising:
   a memory for storing computer executable program code;
   a processor for executing computer executable program code stored in said memory; and
   computer executable program code stored in said memory responsive to a command to select an operating system so as to set a selected operating system as the default operating system of a load utility resident on the programmed computer.

* * * * *